US005890581A

United States Patent [19]

Oppliger et al.

[11] Patent Number: 5,890,581

[45] Date of Patent: Apr. 6, 1999

[54] FEEDING ARRANGEMENT FOR MAILED ITEMS

[75] Inventors: Jean-Claude Oppliger, Brünnlistrasse 66, Switzerland; Thomas Zimmermann, Wutöschingen, Germany

[73] Assignee: Grapha-Holding AG, Hergiswil, Switzerland

[21] Appl. No.: 700,171

[22] Filed: Aug. 20, 1996

[30] Foreign Application Priority Data

Sep. 4, 1995 [CH] Switzerland ..................... 02 501/95-8

[51] Int. Cl.[6] .................................................... B65G 29/00

[52] U.S. Cl. ............................................ 198/624; 198/604

[58] Field of Search .................................... 198/604, 624, 198/608, 626.1

[56] References Cited

U.S. PATENT DOCUMENTS

| | | | |
|---|---|---|---|
| 935,947 | 10/1909 | Thurman | 198/604 |
| 1,928,482 | 9/1933 | Creedon | 198/604 X |
| 2,438,811 | 3/1948 | Le Sage | 198/604 X |
| 3,360,099 | 12/1967 | Barr | 198/604 X |
| 4,573,848 | 3/1986 | Lundblad | 198/624 X |
| 4,619,451 | 10/1986 | Dodge | 198/624 X |
| 5,375,692 | 12/1994 | Staudinger et al. | 198/624 X |

FOREIGN PATENT DOCUMENTS

0519375A1 12/1992 European Pat. Off. .

*Primary Examiner*—James R. Bidwell
*Attorney, Agent, or Firm*—Spencer & Frank

[57] ABSTRACT

An arrangement for feeding transport containers of a sorting conveyor with flat mailed items includes a linear conveyor, having a direction of conveyance and a rearward end, for engaging one surface of the respective mailed items in a planar frictional lock and transferring the mailed items in the direction of conveyance to the transport containers at the rearward end of the linear conveyor. A rotary body having a cylindrical surface including a contact region and being rotatable around an axis extending perpendicularly to the direction of conveyance of the linear conveyor is arranged at the rearward end of the linear conveyor for contacting an opposite surface of the respective mailed item in a frictionally locked manner with the contact region of its cylindrical surface during transfer of the mailed items to the transport vehicles.

16 Claims, 3 Drawing Sheets

FEEDING ARRANGEMENT FOR MAILED ITEMS

CROSS-REFERENCE TO RELATED APPLICATION

This application claims the priority of patent application Ser. No. 02 501/95-8 filed in Switzerland on Sep. 4, 1995, the subject matter of which is incorporated herein by reference.

BACKGROUND OF THE INVENTION

The invention relates to an arrangement for feeding transport containers of a sorting conveyor with flat mailed items, wherein the arrangement has a linear conveyor which engages one surface of the respective mailed items in a planar frictional lock for the transfer of the mailed items to the transport containers.

Arrangements of this type are used, for example, in post offices for sorting of letters according to their mailing addresses. For this purpose, the letters are fed to the feeding arrangement after their mailing addresses have been captured. After transfer to the transport containers, a sorting conveyor then transports the letters to collection points predetermined by the mailing addresses.

For this purpose, a feeding arrangement of the above-described type has been proposed which transfers flat mailed items deposited on a linear conveyor embodied as a conveyor belt extending downward at an angle to the transport containers circulating below the conveyor belt. The transport containers are embodied as transport pouches which can be opened and are secured to a conveyor chain. The planar frictional lock between the one surface of the mailed items and the conveyor belt, i.e., a frictional lock extending longitudinally as well as perpendicularly to the direction of conveyance, ensures that, during the transfer, the conveyor belt adequately carries along standard mailed items and that, thus, the transported items are transferred to the transport containers in a reliable manner. But during the transfer of light mailed items, such as letters, it is possible that the frictional lock between the mailed item and the conveyor belt is cancelled under the influence of turbulent air flows caused by the transport motion and that a disturbance of the transfer occurs.

To solve this problem, it has been proposed to provide the conveyor belt of the feeding arrangement with ribs between which windows are formed that serve to receive the mailed items. Even after a cancellation of the frictional lock, this arrangement can push the mailed items so that they are transferred in direction of conveyance rearward to the transport containers by means of the limiting rib of the respective window. To ensure a reliable transfer in this arrangement, it is necessary to use a guide wall which extends above and parallel to the conveyor belt. As a result, only a narrow lateral opening of a shaft formed between the conveyor belt, the ribs of the windows and the guide wall is available for the deposit of the mailed items on the conveyor belt. Therefore, malfunctions may easily removed when such an arrangement is used, for example, if the mailed items are not oriented precisely parallel to the conveyor belt when placed into the shaft.

European Patent Application EP-A-0 519 375 discloses a feeding arrangement for the transfer of flat mailed items to transport containers of a sorting conveyor wherein, for transfer to the transport containers, the mailed items are conveyed in a roll gap formed between a rotatable roller and a clamping roller. Here, the clamping roller is only applied to the mailed items after the mailed items have been deposited on a depositing surface through which the rotatable roller extends. This ensures a reliable transfer of the mailed items even when they are not oriented precisely parallel to the depositing surface. On the other hand, a large clamping force is necessary between the rotatable roller and the clamping roller for the conveyance of the mailed items in the roll gap. This may result in damage when delicate mailed items are transferred, for example, packages containing eyeglass lenses or the like.

SUMMARY OF THE INVENTION

In view of the above-described problems in the prior art, it is an object of the present invention to provide a feeding arrangement which ensures both a high operational reliability and a gentle transfer of the mailed items to the transport containers.

The above and other objects are accomplished according to the invention by the provision of an arrangement for feeding transport containers of a sorting conveyor with flat mailed items, comprising: a linear conveyor, having a direction of conveyance and a rearward end, for engaging one surface of the respective mailed items in a planar frictional lock and transferring the mailed items in the direction of conveyance to the transport containers at the rearward end of the linear conveyor; and a rotary body having a cylindrical surface including a contact region and being rotatable around an axis extending perpendicularly to the direction of conveyance of the linear conveyor, the rotary body being arranged at the rearward end of the linear conveyor for contacting an opposite surface of the respective mailed items in a frictionally locked manner with the contact region of its cylindrical surface during transfer of the mailed items to the transport vehicles.

The rolling contact of the rotary body on the other, opposite surface of the mailed items, i.e., on the surface facing away from the linear conveyor, ensures a planar frictional lock between the one surface of the mailed items and the linear conveyor due to the inner stiffness of the mailed items, even though the frictional lock between the contact region of the rotary body and the mailed items extends only perpendicularly to the direction of conveyance. Thus, the mailed items are reliably carried along by the linear conveyor during the transfer. To accomplish this purpose, it is sufficient that the contact region of the rotary body apply a relatively small force to the mailed items, which excludes the possibility of damage to delicate mailed items. That is, the force action of the rotary body must merely effect the maintenance of the planar frictional lock between the mailed item and the linear conveyor, but not the actual conveyance of the mailed items for the transfer to the transport containers. Since the contact region only contacts the other surface at the rearward end of the linear conveyor in the direction of conveyance, it is ensured that the planar frictional lock and thus a reliable carrying along of the mailed items is maintained until the mailed items leave the linear conveyor.

Furthermore, the arrangement according to the invention can make a sufficient amount of space available to reliably feed the mailed items to the linear conveyor without impairing the operational reliability during the transfer to the transport containers, because the use of the rotary body can ensure a reliable guidance of the mailed items even without using a guide wall extending parallel to the linear conveyor or similar guiding elements impeding access to the linear conveyor.

In summary, a combined use of the linear conveyor, which engages the one surface of the mailed items in a frictional lock, and of the rotary body, which contacts the side of the mailed items facing away from the linear conveyor, increases the reliability during the feeding of the mailed items to the linear conveyor, on the one hand, and, on the other hand, allows a gentle transfer of delicate mailed items to the transport containers.

The linear conveyor can be embodied in a particularly simple manner in the form of a conveyor belt, thus at the same time ensuring a maximum frictional lock between the mailed items and the linear conveyor.

The rotary body can be embodied in a particularly simple manner if the contact region has the shape of a section of a cylindrical surface of a circular cylinder whose cylinder axis coincides with the rotary axis of the rotary body. This can simultaneously accomplish a uniform force action upon the mailed items by the rotary body in a direction extending perpendicularly to the direction of conveyance.

The reliability of the transfer of the mailed items to the transport containers can be further increased if, during the transfer, the contact region is forced against the other surface by a pretensioning device. This can prevent a cancellation of the planar frictional lock between the one surface of the mailed items and the linear conveyor in a particularly reliable manner. Advisably, the pretensioning force of the pretensioning device can be set to prevent damage of delicate mailed items.

According to a further feature of the invention, to adjust the feeding device to mailed items of different thicknesses, the rotary body is advisably fastened to a frame which is pivotable around a pivot axis extending parallel to the rotary axis. In this configuration, it is particularly preferred from a structural point of view that the pretensioning device engage the frame.

To avoid shearing forces between the linear conveyor and the contact region of the rotary body, the rotary body, preferably with a motor coupled to it, is driven at a rotating speed which is adjusted to the conveying speed of the linear conveyor.

A particularly precise adjustment of the rotating speed of the rotary body to the conveying speed of the linear conveyor, especially to changes of the conveying speed, can be accomplished if only one motor is used to drive both the linear conveyor and the rotary body.

It is particularly preferred in the context of an arrangement for the feeding of transport containers of a sorting conveyor with flat mailed items of the above-described type, wherein the conveying arrangement for the transfer of the mailed items to the transport containers, in which the conveying arrangement engages one surface of the mailed items in a frictionally locked manner, and has a rotary body that is rotatable around a rotary axis extending perpendicularly to the direction of conveyance of the conveying arrangement, which rotary body contacts the other face surface of the mailed items during feeding in a frictionally locked manner, that the rotary body include a region that, in a rotational position of the rotary body, forms a stop for the mailed items to be conveyed by the conveying arrangement.

Thus, on the one hand, the rotary body can effect a reliable guidance of the mailed items during the transfer and, on the other, it can prevent an undesirable displacement of the mailed items relative to the conveying arrangement before the transfer if the rotary body remains in the rotational position in which it forms the stop for the mailed items until the transfer begins.

The stop can be embodied in a particularly simple manner by a stop region of the cylindrical surface of the rotary body extending in an axial plane of the rotary body. At the same time, such a stop can serve to orient the generally rectangular mailed items along the stop region before the transfer. This further contributes to increasing the operational reliability of the feeding arrangement.

To simplify the feeding of the mailed items to the conveying arrangement, it is particularly advantageous if the cylindrical surface of the rotary body has a guide region transitioning in the direction of rotation to the stop region for guiding the mailed items that are to be fed to the conveying arrangement. The rotary body thus serves altogether three functions, namely, on the one hand, a guidance of the mailed items during the transfer, on the other hand, securing the mailed items transferred to the conveying arrangement before the transfer to the transport containers and, finally, a guidance of the mailed items during the feeding to the conveying arrangement.

The guide region can be embodied in a particularly simple manner if it is disposed in a plane that is parallel to the rotary axis and if it has a smaller distance from the rotary axis than the contact region.

For the transfer of the mailed items to transport containers circulating below the conveying arrangement the direction of conveyance is advisably provided with a component oriented in the direction of gravity so as to exploit the force of gravity.

The transfer of the mailed items to the transport containers in increments of predetermined lengths of the mailed items can be controlled in a particularly reliable manner by means of an incremental transmitter.

For space reasons, it is advisable if the mailed items can be fed to the feeding arrangement in a direction that extends perpendicularly to their direction of conveyance.

These and other features and advantages of the invention will be further understood from the following detailed description of the preferred embodiments with reference to the accompanying drawings to which reference is made with regard to all details that are essential for the invention and that are not described in detail in the description.

DETAILED DESCRIPTION OF THE PREFERRED EMBODIMENTS

Figure 1:
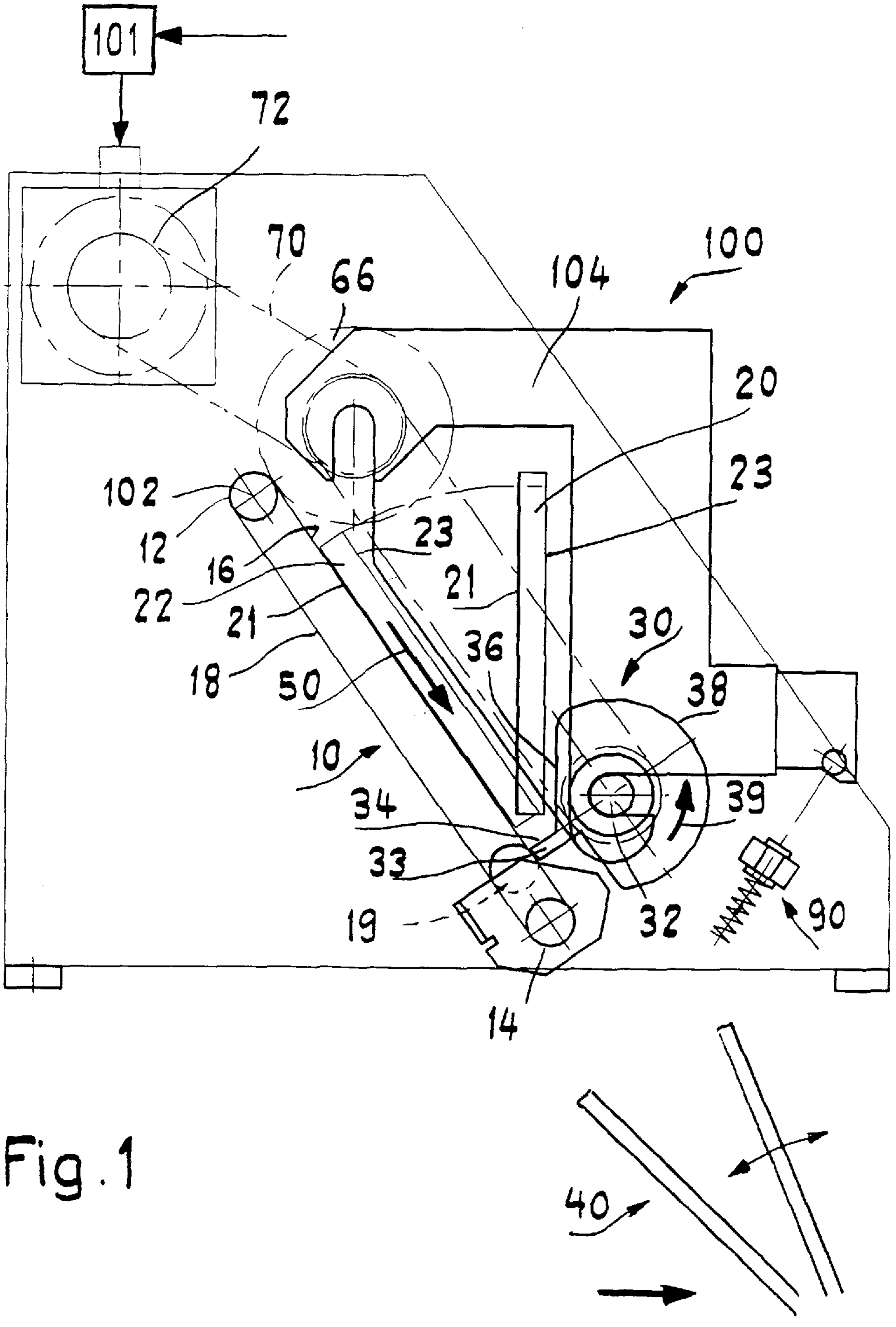
FIG. 1 is a schematic, side view of an embodiment of a feeding arrangement according to the invention.
Figure 2:
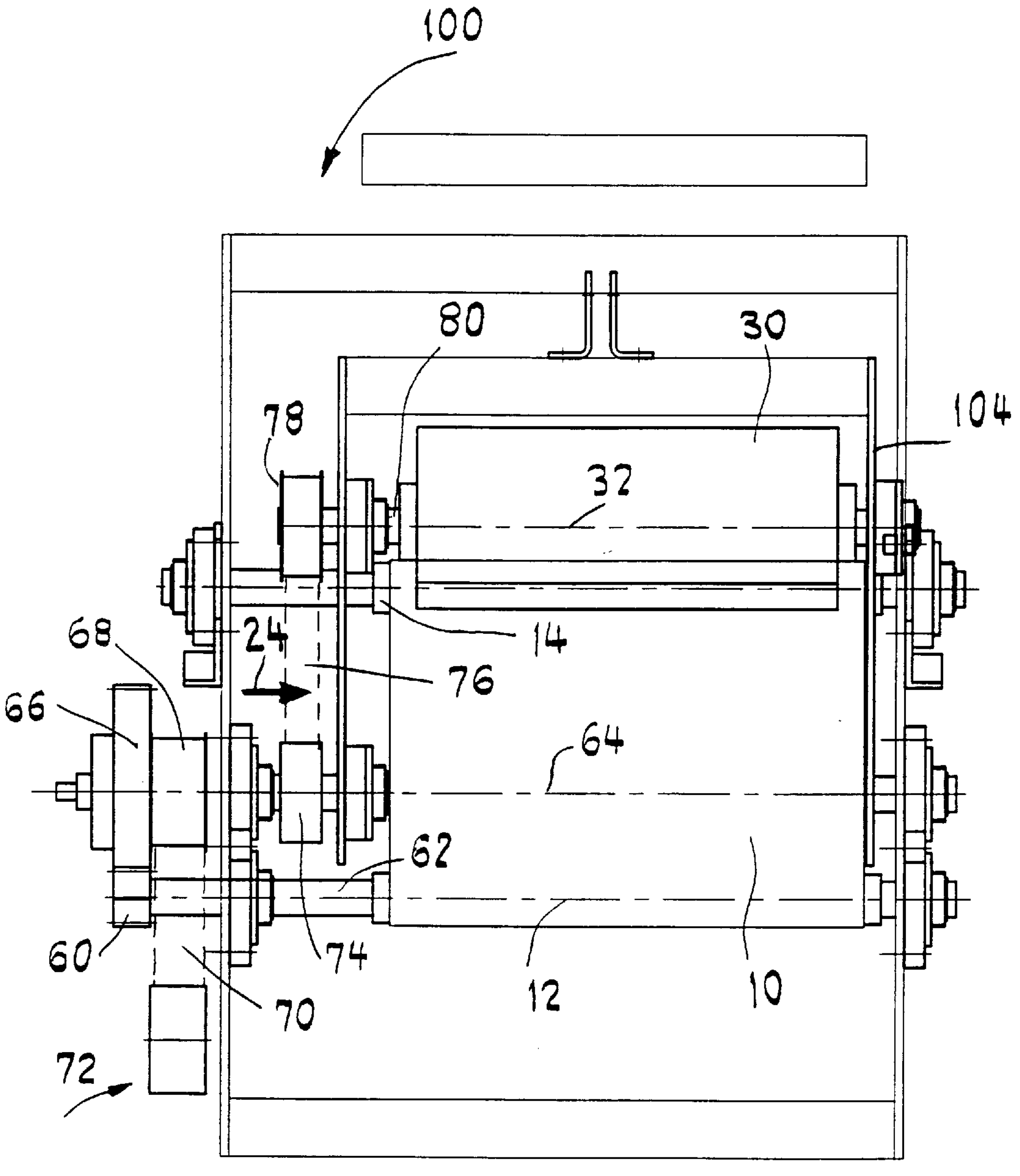
FIG. 2 is a plan view of the feeding arrangement according to FIG. 1.

Referring to FIGS. 1 and 2, there is shown a feeding arrangement including a linear conveyor embodied as a conveyor belt 10 extending downward at an angle and circulating around a drive roller 12 and a deflection roller 14. For the feeding of transport containers 40 circulating below conveyor belt 10, which transport containers are embodied as pouches that can be opened by using a cam track (not shown), mailed items are fed to conveyor belt 10 in a substantially vertical orientation, i.e. in the position indicated in FIG. 1 by reference numeral 20, and from the side, i. e., in a direction indicated by arrow 24 in FIG. 2 which is perpendicular to the direction of conveyance of conveyor belt 10. The mailed items are then deposited on an upper run

16 of the conveyor belt 10, as is indicated by the mailed item identified by reference numeral 22 in FIG. 1. Following deposit of the mailed item, the one surface 21 of the mailed item is placed in a planar frictionally locked engagement with upper run 16 of conveyor belt 10.

Following deposit of the mailed item on conveyor belt 10, unintentional sliding is prevented by a stop region 34 of a cylindrical surface of a rotary body 30 which is rotatable around a rotary axis 32 extending perpendicularly to the direction of conveyance of conveyor belt 10. Stop region 34 is disposed in a radial plane of rotary body 30 and is formed by a stop rib 33 of rotary body 30. Stop region 34 additionally serves to orient an edge of the mailed items parallel to rotary axis 32.

For the transfer of a mailed item to transport container 40, the mailed item is conveyed downward by conveyor belt 10 in the direction identified by arrow 50. For this purpose, drive roller 12 is coupled to a motor 72 via a first shaft 62 (see FIG. 2) connected to drive roller 12 in a manner fixed against relative rotation and extending coaxially to it, a first toothed wheel 60 connected to first shaft 62 in a manner fixed against relative rotation, a second toothed wheel 66, which is secured in a manner fixed against relative rotation to a second shaft 64 extending parallel to first shaft 62 and which meshes with first toothed wheel 60, a driving disk 68 fixed to second shaft 64 in a manner fixed against relative rotation, and a first driving belt 70.

Motor 72 additionally drives rotary body 30 to rotate around axis 32 in a direction identified by arrow 39 (see FIG. 1) so that a contact region 38 of the cylindrical surface of rotary body 30 contacts a surface 23 of the mailed item facing away from conveyor belt 10 during the transfer of the mailed item. Here, the coupling of rotary body 30 to motor 72 is set such that, during the transfer, the circumferential speed of contact region 38 corresponds to the conveying speed of conveyor belt 10. For this purpose, rotary body 30 is secured in a manner fixed against relative rotation on a third shaft 80 extending coaxially to rotary axis 32 and parallel to second shaft 64 and is coupled to motor 72 via a third driving disk 78 secured to third shaft 80 in a manner fixed against relative rotation, a second driving belt 76, a driving disk 74 secured to second shaft 64 in a manner fixed against relative rotation, first driving disk 68, and first driving belt 70.

During the transfer, contact region 38 is forced by means of a pretensioning device 90 against surface 23 of the mailed item facing away from conveyor belt 10. For this purpose, rotary body 30 is secured to a frame 100 which is pivotable around a pivot axis 102 extending coaxially to second shaft 64. Pretensioning device 90 has substantially a helical spring as a tensioning element and engages the end of frame 100 facing away from pivot axis 102.

By mounting rotary body 30 on pivotable frame 100 and by using pretensioning device 90, it is possible to set a pressing force of contact region 38 on surface 23 of the mailed item facing away from the conveyor belt 10. On the other hand, this arrangement additionally serves to adjust the feeding arrangement to mailed items of different thickness.

At a front side relative to the feeding direction 24 of the mailed items, frame 100 has an angled section which, together with conveyor belt 10, forms a large feed opening for mailed items to be deposited on conveyor belt 10.

Figure 3:
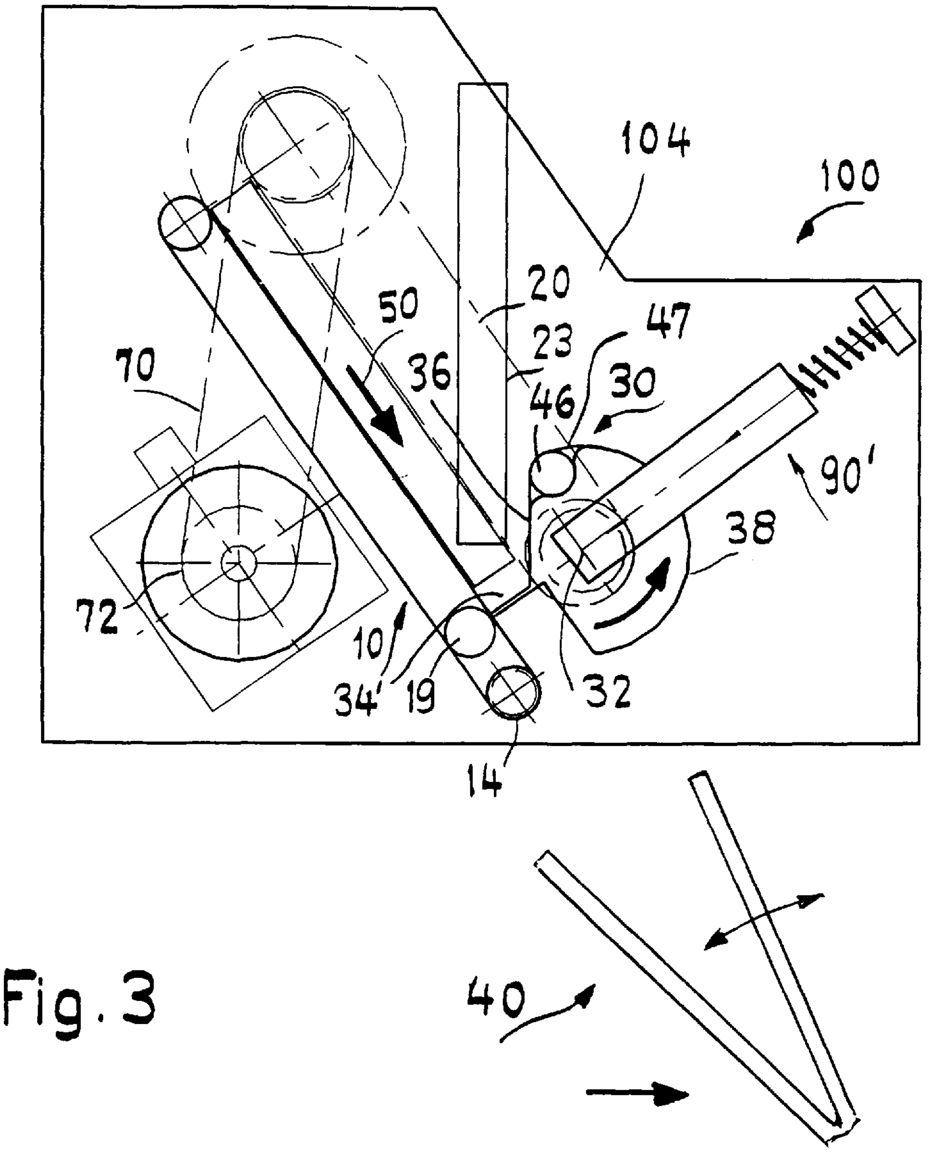
FIG. 3 is schematic, side view of an alternative embodiment of a feeding arrangement according to the invention.

FIG. 3 shows an alternative embodiment wherein rotary body 30 is embodied to include a pretensioning device 90' in the form of a telescope and supported on a rigid frame segment. Pretensioning device 90' is located opposite a stop 34' in a position of rotary body 30 at which stop 34' is closest to conveyor belt 10 so that rotary body 30 can lift off conveyor belt 10 approximately in a perpendicular direction according to a thickness of an arriving mailed item.

During feeding of the mailed items, rotary body 30 is in the position illustrated in FIG. 1 in which a region 36 of its cylindrical surface, which extends parallel to rotary axis 32 and transitions to stop region 34 in the direction of rotation 39, forms a guide for the mailed items to be deposited on conveyor belt 10.

According to the embodiment of FIG. 3, an area between guide region 36 and contact region 38 is embodied as a yieldable insert 46 to mitigate roll-on contact of the rotary body 30. For this purpose, insert 46 may comprise, for example, a foam material held by a flexible cover 47 partially surrounding rotary body 30.

At the end disposed behind the conveyor belt 10 relative to feeding direction 24, frame 100 includes a side wall 104 extending perpendicularly to pivot axis 102. The side wall forms a stop for the mailed items deposited on conveyor belt 10 in the direction of arrow 24 (FIG. 2).

Finally, the feeding arrangement illustrated in the drawing is additionally provided with a support roller 19, which is arranged between upper run 16 and a lower run 18 of conveyor belt 10 and which extends parallel to deflection roller 14. This support roller 19 forms an abutment for contact region 38 contacting the surface of the mailed items facing away from conveyor belt 10, thereby preventing a deformation of conveyor belt 10.

The invention is not limited to the embodiment explained by way of the drawing. For example, stop ribs secured on the conveyor belt 10 may be used instead of stop rib 33 of rotary body 30. Additionally, it is possible to use a separate guide element for the guidance of the mailed items during deposition on the conveyor belt 10.

It will be understood that the above description of the present invention is susceptible to various modifications, changes and adaptations, and the same are intended to be comprehended within the meaning and range of equivalents of the appended claims.

Further, FIG. 1 shows an incremental transmitter which controls the mailed items to the transport containers in increments of predetermined lengths of the mailed items.

What is claimed is:

1. An arrangement for feeding transport containers of a sorting conveyor with flat mailed items, comprising:

a linear conveyor having a flat surface and a rearward end for engaging one surface of the respective mailed items in a planar frictional lock and transferring the mailed items in a direction of conveyance to the transport containers at the rearward end of the linear conveyor; and a circular cylinder rotatable around an axis extending perpendicularly to the direction of conveyance of the linear conveyor and having a cylindrical surface including a contact region which constitutes a section of the cylindrical surface, the circular cylinder being arranged at the rearward end of the linear conveyor for contacting an opposite surface of the respective mailed item in a frictionally locked manner with the contact region of its cylindrical surface during transfer of the mailed items to the transport vehicles.

2. An arrangement according to claim 1, wherein the linear conveyor is a conveyor belt.

3. An arrangement according to claim 1, wherein the contact region has a shape of a section of a cylindrical surface of a circular cylinder having a cylinder axis coinciding with the axis of the rotary body.

4. An arrangement according to claim 1, further including a frame which is pivotable around a pivot axis extending parallel to the axis of the circular cylinder, wherein the circular cylinder is fastened to the frame.

5. An arrangement according to claim 1, further comprising a pretensioning device operatively coupled to the circular cylinder for forcing the contact region against the opposite surface of a mailed item during a transfer.

6. An arrangement according to claim 5, wherein the pretensioning device engages the frame.

7. An arrangement for feeding transport containers of a sorting conveyor with flat mailed items, comprising:

a linear conveyor, having a direction of conveyance and a rearward end, for engaging one surface of the respective mailed items in a planar frictional lock and transferring the mailed items in the direction of conveyance to the transport containers at the rearward end of the linear conveyor; and a rotary body having a cylindrical surface including a contact region and being rotatable around an axis extending perpendicularly to the direction of conveyance of the linear conveyor, the rotary body being arranged at the rearward end of the linear conveyor for contacting an opposite surface of the respective mailed item in a frictionally locked manner with the contact region of its cylindrical surface during transfer of the mailed items to the transport vehicles;

wherein the linear conveyor has a conveying speed and the arrangement further comprises a motor coupled to the rotary body for driving the rotary body with a rotating speed adjusted to the conveying speed of the linear conveyor.

8. An arrangement according to claim 7, wherein the motor is the only motor provided for driving both the linear conveyor and the rotary body.

9. An arrangement for feeding transport containers of a sorting conveyor with flat mailed items, comprising:

a linear conveyor, having a direction of conveyance and a rearward end, for engaging one surface of the respective mailed items in a planar frictional lock and transferring the mailed items in the direction of conveyance to the transport containers at the rearward end of the linear conveyor; and a rotary body having a cylindrical surface including a contact region and being rotatable around an axis extending perpendicularly to the direction of conveyance of the linear conveyor, the rotary body being arranged at the rearward end of the linear conveyor for contacting an opposite surface of the respective mailed item in a frictionally locked manner with the contact region of its cylindrical surface during transfer of the mailed items to the transport vehicles;

wherein the rotary body includes a stop region which, in a rotational position of the rotary body comprises, a stop for the mailed items to be conveyed by the conveying arrangement.

10. An arrangement according to claim 9, wherein the stop region comprises a region of the cylindrical surface of the rotary body extending in an axial plane of the rotary body.

11. An arrangement according to claim 10, wherein the cylindrical surface of the rotary body includes a guide region transitioning in the direction of contact to the stop region for guiding the mailed items that are to be fed to the conveying arrangement.

12. An arrangement according to claim 11, wherein the guide region is disposed in a plane which extends parallel to the rotary axis and which has a smaller distance from the rotary axis than the contact region.

13. An arrangement according to claim 12, wherein an area formed by the guide region and the contact region is embodied so as to be yielding.

14. An arrangement according to claim 1, wherein the direction of conveyance has a component oriented in the direction of gravity.

15. An arrangement for feeding transport containers of a sorting conveyor with flat mailed items, comprising:

a linear conveyor, having a direction of conveyance and a rearward end, for engaging one surface of the respective mailed items in a planar frictional lock and transferring the mailed items in the direction of conveyance to the transport containers at the rearward end of the linear conveyor;

a rotary body having a cylindrical surface including a contact region and being rotatable around an axis extending perpendicularly to the direction of conveyance of the linear conveyor, the rotary body being arranged at the rearward end of the linear conveyor for contacting an opposite surface of the respective mailed item in a frictionally locked manner with the contact region of its cylindrical surface during transfer of the mailed items to the transport vehicles; and an incremental transmitter to control the feeding arrangement in increments of predetermined lengths of the mailed items.

16. An arrangement according to claim 1, wherein the arrangement is adapted for receiving mailed items fed in perpendicularly to the direction of conveyance.

* * * * *